(12) United States Patent
van Niekerk et al.

(10) Patent No.: US 9,097,272 B2
(45) Date of Patent: Aug. 4, 2015

(54) FIXING ARRANGEMENT FOR FIXING MOTOR VEHICLE COMPONENTS

(71) Applicant: Bayerische Motoren Werke Aktiengesellschaft, Munich (DE)

(72) Inventors: Johann van Niekerk, Munich (DE); Mario Ernst, Geisenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 231 days.

(21) Appl. No.: 13/734,063

(22) Filed: Jan. 4, 2013

(65) Prior Publication Data
US 2013/0125372 A1 May 23, 2013

Related U.S. Application Data

(63) Continuation of application No. PCT/EP2011/002793, filed on Jun. 8, 2011.

(30) Foreign Application Priority Data

Jul. 6, 2010 (DE) .......................... 10 2010 030 964

(51) Int. Cl.
*F16C 1/14* (2006.01)
*F16C 11/06* (2006.01)
(Continued)

(52) U.S. Cl.
CPC ............... *F16B 21/04* (2013.01); *F16B 21/065* (2013.01); *F16B 21/073* (2013.01); *B60S 1/0447* (2013.01); *F16B 5/126* (2013.01); *Y10T 29/49895* (2015.01); *Y10T 403/7007* (2015.01)

(58) Field of Classification Search
CPC ...... F16B 21/04; F16B 21/073; F16B 21/065; F16B 5/126; Y10T 403/7007; Y10T 29/49895; B60S 1/0447
USPC ........... 29/428, 450, 453, 522.1, 523, 525.01, 29/525.03, 525.04; 24/457, 458, 662, 681, 24/682.1, 664; 403/122, 128, 130, 133, 403/131, 134, 135, 140, 141, 144; 74/502.4, 502.6
See application file for complete search history.

(56) References Cited

U.S. PATENT DOCUMENTS 3,853,414 A * 12/1974 Hirano et al. ................... 403/71
4,176,428 A 12/1979 Kimura
(Continued)

FOREIGN PATENT DOCUMENTS

CN 1246095 A 3/2000
CN 101074693 A 11/2007
(Continued)

OTHER PUBLICATIONS

German Office Action with English translation dated Jun. 8, 2011 (twelve (12) pages).

(Continued)

*Primary Examiner* — David Bryant
*Assistant Examiner* — Jun Yoo
(74) *Attorney, Agent, or Firm* — Crowell & Moring LLP (57) ABSTRACT

A fixing arrangement for fixing a first motor vehicle component to a second motor vehicle component includes first second fixing elements. The first and second fixing elements are connectable to each other in a positive locking manner. The second fixing element has a pin configured as a ball; and the first fixing element has a sleeve that fits over the spherical pin to produce a positive locking engagement. The first fixing element has a securing device designed as a cap, which is mounted on an outer shell sleeve surface such that the cap is movable in the axial direction. The sleeve is locked on the spherical pin by axial relative movement of the cap from a defined first position into a defined second position.

9 Claims, 6 Drawing Sheets

(51) Int. Cl.
 *F16B 21/04* (2006.01)
 *F16B 21/06* (2006.01)
 *F16B 21/07* (2006.01)
 *B60S 1/04* (2006.01)
 *F16B 5/12* (2006.01)

(56) References Cited

U.S. PATENT DOCUMENTS

| | | | |
|---|---|---|---|
| 5,265,495 A * | 11/1993 | Bung et al. | 74/502.6 |
| 5,419,606 A | 5/1995 | Hull et al. | |
| 5,596,789 A * | 1/1997 | Simioni | 16/228 |
| 6,190,080 B1 * | 2/2001 | Lee | 403/135 |
| 6,253,423 B1 | 7/2001 | Friedrich et al. | |
| 7,001,128 B2 | 2/2006 | Kuntze | |
| 7,044,018 B2 * | 5/2006 | Sanchez et al. | 74/502.4 |
| 7,908,717 B2 | 3/2011 | Alhof et al. | |
| 2005/0121560 A1 | 6/2005 | Slyter | |
| 2006/0275073 A1 | 12/2006 | Reszka et al. | |
| 2007/0087612 A1 | 4/2007 | Tsujita | |
| 2008/0201920 A1 | 8/2008 | Jatzke | |

FOREIGN PATENT DOCUMENTS

| | | |
|---|---|---|
| CN | 101251142 A | 8/2008 |
| DE | 44 38 309 A1 | 6/1995 |
| DE | 20 2006 011 220 U1 | 1/2007 |
| DE | 20 2006 018 347 U1 | 4/2007 |
| DE | 10 2008 012 311 B3 | 11/2009 |
| EP | 1 555 176 A1 | 7/2005 |
| EP | 1 719 925 A1 | 11/2006 |
| EP | 2 006 171 A2 | 12/2008 |

OTHER PUBLICATIONS

International Search Report including English translation dated Oct. 12, 2011 (four (4) pages).

German Search Report including partial English translation dated Jan. 31, 2011 (nine (9) pages).

English translation of Chinese Office Action dated Jul. 7, 2014 (six (6) pages).

* cited by examiner

FIXING ARRANGEMENT FOR FIXING MOTOR VEHICLE COMPONENTS

CROSS REFERENCE TO RELATED APPLICATIONS

This application is a continuation of PCT International Application No. PCT/EP2011/002793, filed Jun. 8, 2011, which claims priority under 35 U.S.C. §119 from German Patent Application No. 10 2010 030 964.8, filed Jul. 6, 2010, the entire disclosures of which are herein expressly incorporated by reference.

BACKGROUND AND SUMMARY OF THE INVENTION

The invention relates to a fixing arrangement for fixing a first motor vehicle component to a second motor vehicle component. Furthermore, the invention relates to a method for fixing a first motor vehicle component to a second motor vehicle component using the fixing arrangement.

Fixing a motor vehicle component to another motor vehicle component is a basic problem that recurs periodically in automotive engineering. The conventional method is to fasten, for example, by use of screw couplings, motor vehicle components to the components of the vehicle body in such a way that the motor vehicle components can be disconnected again. However, the screw coupling is a working step that is relatively time-consuming and costly. Therefore, fixing arrangements without a screw coupling are also known from the state of the art.

EP 1 555 176 A1 discloses a fixing arrangement without a screw coupling. In this case, the fixing arrangement has two fixing elements that can be connected together in a positive locking manner. One of these fixing elements is a ball pin; and the other fixing element is a sleeve or, more specifically, a coupling. The coupling can fit over the pin that is constructed in the manner of a ball, so that these two fixing elements are fastened to each other. Furthermore, the other fixing element has a securing device, which locks or, more specifically, secures the sleeve on the spherically designed pin in the fixed state. The spherical geometry of the spherically designed pin prevents the fixing elements from tilting not only when the fixing elements are fixed in a positive locking manner, but also when the fixing elements are released, a feature that constitutes a significant advantage for a fixing arrangement of this type.

The object of the present invention is to provide a fixing arrangement of the type that is described above and that is both easy to use and also cost effective to produce.

This and other objects are achieved by the inventive fixing arrangement and fixing method for fixing a first motor vehicle component to a second motor vehicle component. The arrangement comprises at least a first and at least a second fixing element; and this first fixing element and this second fixing element can be connected to each other in a positive locking manner. In this case, the second fixing element has a pin that is constructed in the manner of a ball; and the first fixing element has a sleeve that can fit over the spherically designed pin, in order to produce a positive locking engagement. Furthermore, it is provided that the first fixing element has a securing device for locking or, more specifically, securing the fixing elements that are connected to each other in a positive locking manner. The invention provides that this securing device is designed as a cap, which is mounted on the outer shell surface of the sleeve in such a way that the cap can be moved in the axial direction. In this case it is possible to lock, or more specifically to secure, the sleeve on the spherically designed pin by way of an axial relative movement of the cap from a defined first position into a defined second position.

The fixing arrangement according to the invention is used to permanently fix a first motor vehicle component to a second motor vehicle component. A first motor vehicle component is preferably an installation part, such as an insulating plate, a control unit, a lining part, a cable strand conduit, etc. However, a first motor vehicle component can also be an add-on part, such as a decorative trim element, a radiator cover, a license plate holder, etc. A second motor vehicle component is preferably a component, which is attached to the vehicle body; and in particular, a body component, which is integrated into the body of the vehicle. The fixing arrangement according to the invention can also be used to temporarily fix motor vehicle components, for example, to align and prefix body components during the construction of the vehicle body.

The fixing arrangement according to the invention comprises a second fixing element. The second fixing element has a pin, which is constructed in the manner of a ball. In this case, a ball is understood to mean a component that has a section that is constructed in the form of a ball or at least in the form of a sector of a sphere. The spherically designed pin can consist, for example, of a pin or a mandrel with a ball, arranged on the pin or mandrel, as known from EP 1 555 176 A1. However, it is preferably provided that the spherically designed pin is a ball pin. The spherically designed pin is connected preferably by welding to the second motor vehicle component, which in this case is, in particular, a component of a vehicle body (a process that can be performed, for example, at the metal stamping shop) and projects from the vehicle body. Preferably, the spherically designed pin is made of an aluminum material, a steel material and, in particular, a stainless steel material. Optionally, the spherically designed pin may or may not be provided with a coating and, in particular, a hard coat.

Furthermore, the fixing arrangement according to the invention comprises a first fixing element. The first fixing element has a sleeve. In this case a sleeve is understood to mean a component that resembles a tube or is similar to a tube extending in the axial direction; and that at least one axial end of this sleeve has an opening (or the like), in which the spherically designed pin of the second fixing element can be accommodated at least in sections. In this context this axial end of the sleeve fits over the respective section of the spherically designed pin, as a result of which a positive engagement is produced. The overlapping area that is required by the design specification between this axial end of the sleeve and the spherically designed pin of the second fixing element can be referred to as the fixing section. The inner contour of the fixing section can be constructed with a shape that corresponds to the spherically designed pin, so that the resulting positive locking engagement is improved. Preferably it is provided that the opening in the sleeve has a circularly round cross section. However, as an alternative, the opening in the sleeve can be designed as an oblong hole, which makes it possible to compensate for mounting tolerances.

The spherically designed pin of the second fixing element and the sleeve of the first fixing element are adapted to each other in the context of the design layout. The fixing forces that can be attained can be set, for example, subject to the design configuration, by way of the size of the spherical section, the axial length of the overlapping area and/or the sleeve material. The fixing arrangement according to the invention generates preferentially static fixing forces. Yet, it is possible to fix the motor vehicle parts, such as a roof rack, a bumper, etc., which are subject to alternating and, in particular, also dynamic stress, with the fixing arrangement according to the invention.

According to the invention, the first fixing element has a securing device that is designed as a cap. Owing to this function this securing device can also be referred to as the actuating device. A cap is understood to mean a component that is constructed in the manner of a hat or a coupling and that is mounted on the outer shell surface of the sleeve in such a way that it can move in the axial direction. It is possible to lock or, more specifically, to secure the fixing elements, which are connected to each other in a positive locking manner, by way of an axial movement of the cap relative to the sleeve from a defined first axial position into a defined second axial position. The term locking or more specifically securing is understood to mean fixing and/or retaining in position the sleeve on the spherically designed pin, so that an unintentional separation is prevented. In this respect the securing can also be called the locking. Furthermore, the securing is also used to generate the targeted fixing forces. Preferably, it is provided that the securing can be reversible by moving the cap back out of the defined second axial position into the defined first axial position. As a result, it is possible to cancel again in an advantageous way without destruction the fixing of a first motor vehicle component to a second motor vehicle component, where this fixing was brought about by the fixing arrangement according to the invention.

Furthermore, a major advantage of the fixing arrangement according to the invention lies in the fact that it is possible to dispense with corrosion critical points (in particular, in the transition zone between a dry and a wet area) due to the elimination of punched holes in the vehicle body, the punched holes being usually necessary for the conventional threaded joint or plug and socket connection. As a result, it is also possible to dispense with sealing measures known from the state of the art. Other advantages of the fixing arrangement according to the invention are: a reduction in the production costs and material costs, as well as a reduction in the industrial systems, the equipment engineering and the maintenance costs. One advantage of the fixing arrangement according to the invention may also be seen in the fact that this fixing arrangement is especially suited for retrofitting.

A preferred further development provides that the sleeve of the first fixing element has a fixing section on an axial end; and that the fixing section fits at least in sections over the spherically designed pin of the second fixing element in the fixed state; and that the sleeve wall has a plurality of recesses, which extend longitudinally in the axial direction, at least in the area of this fixing section. These recesses, which are constructed, in particular in the manner of a slot, make it possible for the sleeve wall to elastically expand or constrict in the radial direction, so that the axial end of the sleeve can fit over the respective section of the pin that is constructed in the manner of a ball. There are preferably three and, in particular, four recesses, which are arranged in such a way that they are evenly distributed relative to the periphery. The recesses can also be constructed in the form of wide grooves, so that the sleeve wall in the area of the fixing section consists of individual tongues that are spaced apart by means of the grooves. In this case the tongues define between themselves the opening, in which the spherically designed pin of the second fixing element can be accommodated at least in sections.

A preferred further development provides that the mating groove and bead elements are arranged at the outer shell surface (outer peripheral surface) of the sleeve wall and on the corresponding inner shell surface (inner peripheral surface) of the cap of the first fixing element. These groove and bead elements define the defined first position and the defined second position of the cap relative to the sleeve. There are preferably a plurality of groove and bead elements that are spaced apart axially. This feature is explained in detail below in conjunction with the figures.

It is preferably provided that only some of the groove and bead elements are engaged in the defined first position of the cap relative to the sleeve of the first fixing element, so that the cap is mounted on the sleeve in such a way that it is secure against loss. Furthermore, it is preferably provided that all of the groove and bead elements are engaged in the defined second position, so that the result is a reliable securing of the sleeve on the pin that is constructed in the manner of a ball. This feature is explained in detail below in conjunction with the figures.

A preferred further development provides that the face side of the fixing section of the sleeve of the first fixing element has at least one and, in particular, a plurality of spacers that project, in particular, in the axial direction. In addition and beyond this feature, for example, the sleeve can be brought into a defined contact with the second motor vehicle component in the fixed state or in the course of fixing. Preferably, the spacers are designed as axial projections.

A preferred further development provides that the second motor vehicle component is a component, which is mounted on the vehicle body, and in particular, a body component that is integrated into the body of the vehicle; and that the first component is an add-on part or an installation part, as already explained above.

A preferred further development provides that the sleeve that belongs to the first fixing element is integrated into the first motor vehicle component that is to be fixed. This arrangement simplifies the alignment of the first motor vehicle component that is to be fixed as well as the fixing process. This feature is explained in detail below in conjunction with the figures.

A preferred further development provides that the first fixing element is formed of a synthetic plastic material or a composite material. This applies to both the sleeve and the cap. It is preferably provided that the sleeve and/or the cap has or have a reinforcement and/or sheathing made of a metal material. In particular, it is provided that they involve parts that are produced by an injection molding technique.

An exemplary method according to the invention is used to fix a first motor vehicle component to a second motor vehicle component using a fixing arrangement according to the invention. This method comprises the following steps:
  (a) providing a second motor vehicle component with a second fixing element that is arranged on said second motor vehicle component;
  (b) aligning a first motor vehicle component, which is to be fixed, relative to the second motor vehicle component;
  (c) fixing the first motor vehicle component to the second motor vehicle component by attaching (mounting) the first fixing element, so that the axial end of a sleeve of the first fixing element fits in a positive locking manner over the respective section of a spherically designed pin of the second fixing element; and
  (d) finally moving the cap at the first fixing element from a defined first position into a defined second position, so that the securing is produced.

Preferably, the first motor vehicle component, which is to be fixed, is both aligned and fixed during this process.

The explanations relating to the fixing arrangement according to the invention apply in an analogous manner to both the inventive method and its further developments.

Other objects, advantages and novel features of the present invention will become apparent from the following detailed description of one or more preferred embodiments when considered in conjunction with the accompanying drawings.

DETAILED DESCRIPTION OF THE DRAWINGS

Such positional data, as "bottom" and "top," as used below, relate to the drawing in FIG. 1. The axial direction is denoted with the reference letter L in FIG. 1. The radial direction R is defined as the perpendicular to this axial direction L.

Figure 1:
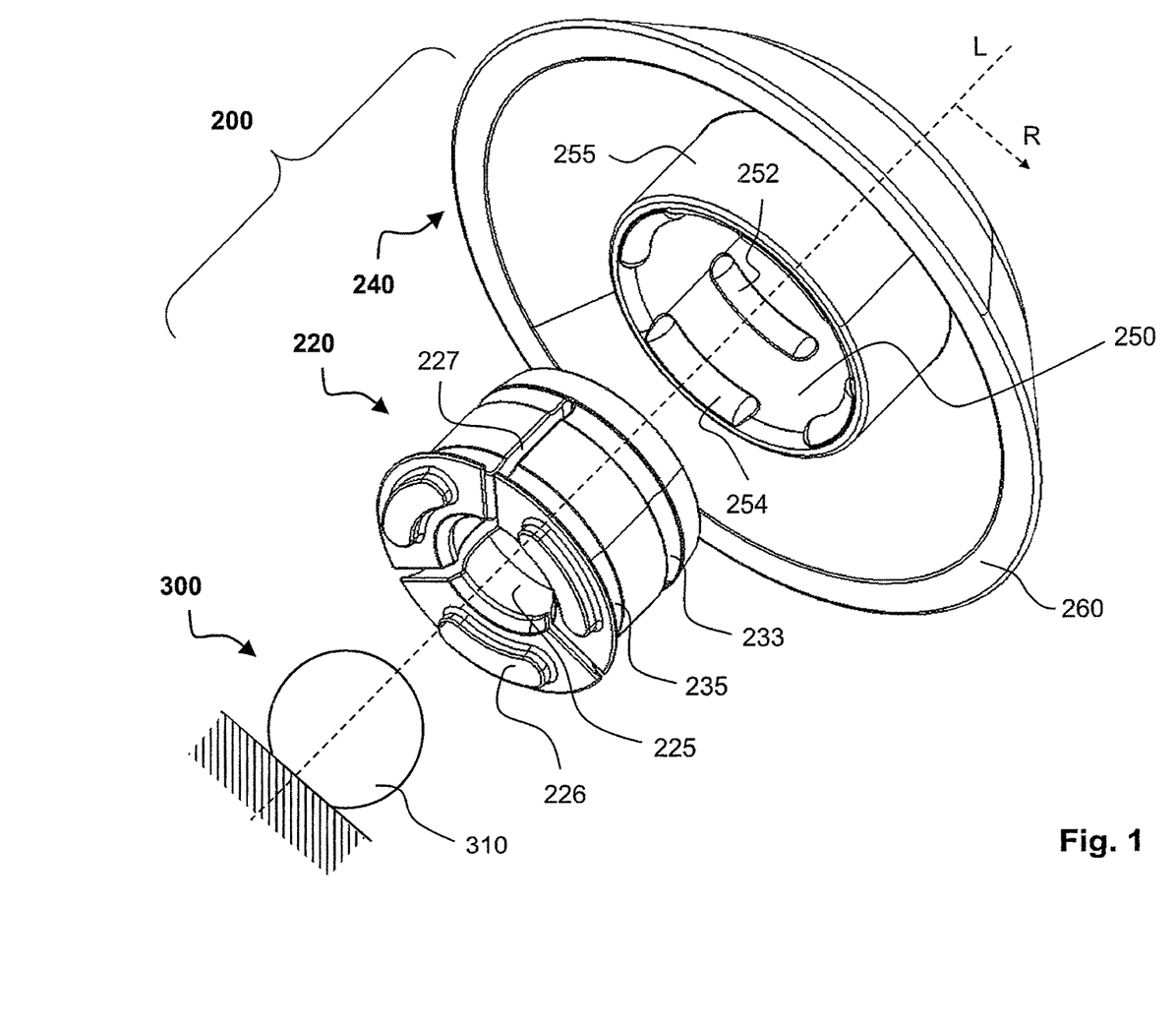
FIG. 1 shows a first exemplary embodiment of the inventive fixing arrangement in a perspective exploded view.

FIG. 1 shows a first exemplary embodiment of an inventive fixing arrangement for fixing a first motor vehicle component to a second motor vehicle component. The illustrated fixing arrangement includes a second fixing element 300, which is shown only in schematic form, with a ball pin 310, which is securely welded to the second motor vehicle component, which is also illustrated only in schematic form. Furthermore, the illustrated fixing arrangement includes a first fixing element 200, which consists of a cylindrical sleeve 220 and a cap 240 that is formed in the manner of a hat. Both the sleeve and the cap are shown separately from each other for the sake of a better overview. The sleeve 220 is formed as one piece. The cap 240 is also formed preferably as one piece. However, it is also possible to form the cap 240 as a plurality of pieces.

Figure 3:
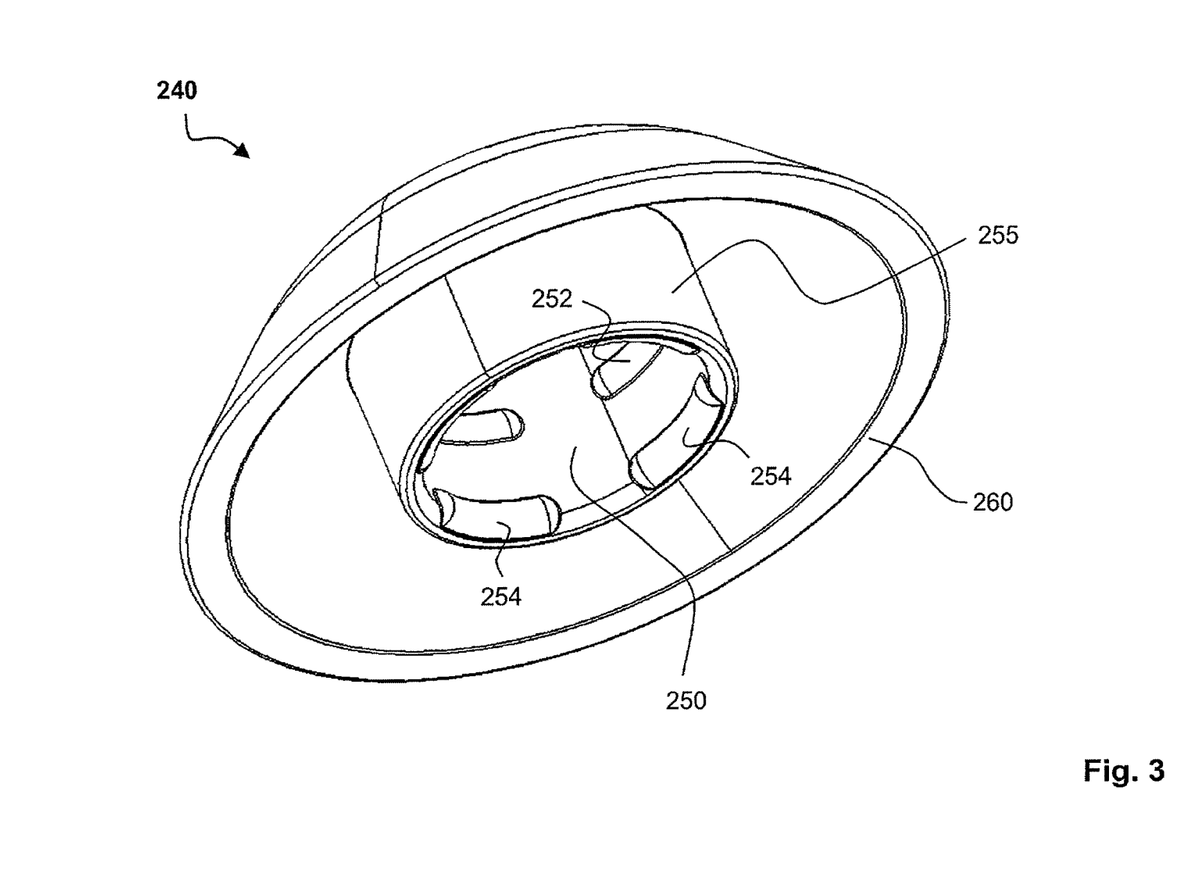
FIG. 3 shows the cap of the fixing arrangement of FIG. 1 in a perspective detail view.

The cap 240 has an apron-like rim 260, which surrounds a cylindrical center piece 255, in which a central hole (receptacle) 250 is arranged. In the working state the cap 240 is mounted on the outer shell surface of the sleeve 220 in such a way that the cap can move in the axial direction (axis L). As a result, the sleeve 220 is received at least in sections in the central hole 250 of the cap 240 in such a way that the sleeve fits precisely. FIG. 3 is an enlarged view of the same cap 240 in a different perspective view. Instead of designing the cap 240 in the manner of a hat as illustrated, it is also possible to have other embodiments, as shown, for example, in FIG. 4 (cap 240').

The bead ring segments 252 and 254, which project radially inwards, are formed at the inner shell surface of the central hole 250 of the cap 240 and on two peripheral lines that are spaced apart in the axial direction. Each of the peripheral lines has, for example, four bead ring segments. Instead of the illustrated bead ring segments 252 and 254, it is also possible to have continuous bead rings. Corresponding to these bead ring segments 252 and 254, the outer shell surface of the sleeve wall of the sleeve 220 has two totally circumferential grooves 233 and 235, which are spaced apart in the axial direction in such a way that the axial spacing between the grooves 233 and 235 matches the axial spacing between the bead ring segments 252 and 254 on the cap 240.

The positive locking engagement of the bead ring segments 252 and 254 with the grooves 233 and 235 defines a first and a second position of the cap 240 relative to the sleeve 220. Furthermore, this arrangement allows the cap 240 to be mounted on the sleeve 220 in such a way that the cap is secure against loss. In the basic state (the state as received from the supplier) of the first fixing element 200, the cap 240 may be in a defined first position with respect to the sleeve 220, in which the bottom bead ring segments 254 of the cap 240 engage with the upper groove 233 of the sleeve 220.

The bottom axial end of the sleeve 220 has an opening 225, in which the ball pin 310 of the second fixing element 300 can be accommodated, as a result of which the sleeve 220 fits over the ball pin 310 and, in so doing, produces a positive locking engagement. The overlapping area that is required by the design specification between the sleeve 220 and the ball pin 310 can be referred to as the fixing section. The axial end opposite the opening 225 has the sleeve 220 with a closed face side. The bottom face side of the sleeve 220 that is constructed in the form of a circular ring has a plurality of spacers 226, which are designed as projections. These spacers allow the sleeve 220 to rest against the second motor vehicle component in a defined way and, in particular, without tilting.

Figure 2:
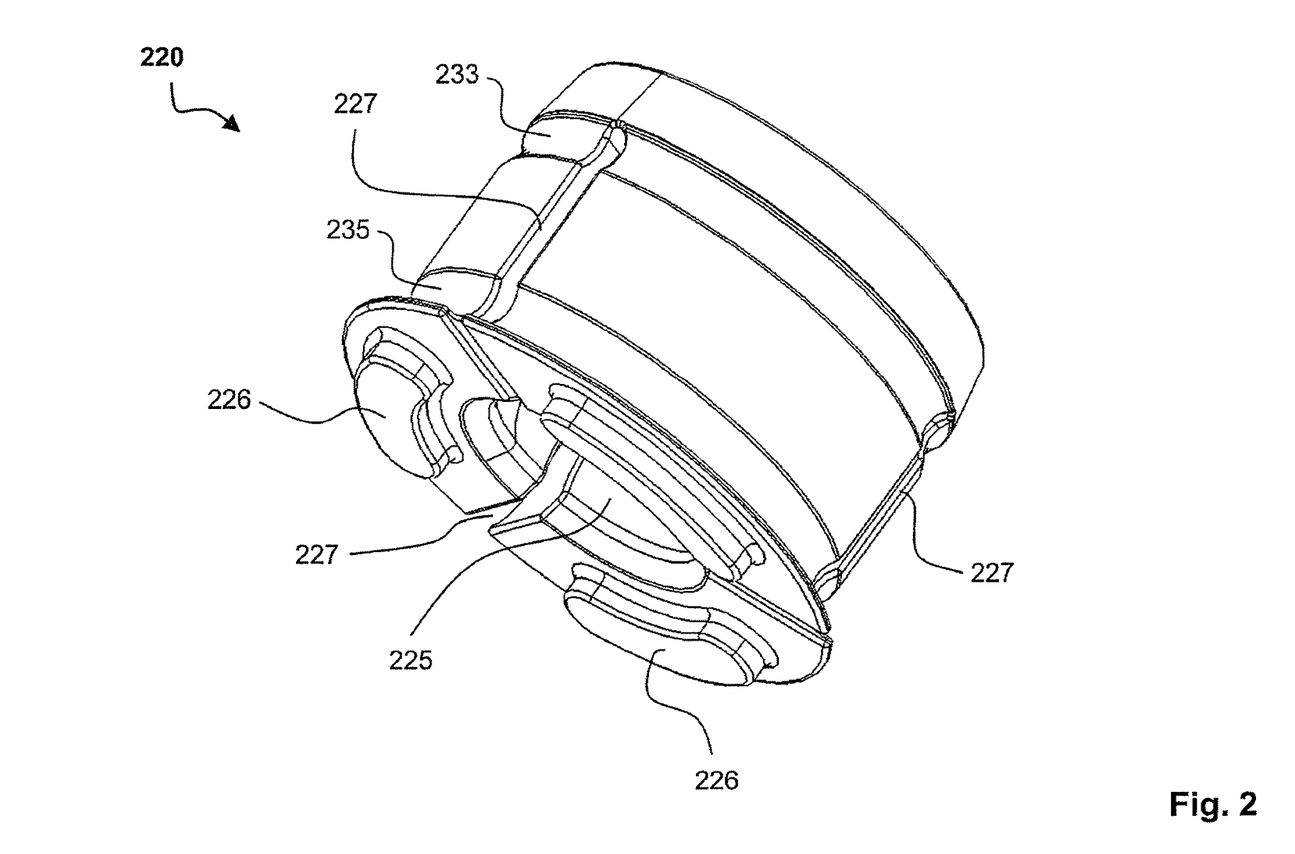
FIG. 2 shows the sleeve of the fixing arrangement of FIG. 1 in a perspective detail view.

In the fixing section of the sleeve 220, the sleeve wall is constructed with three recesses 227, which are configured in the manner of slots. These recesses are spaced equidistant apart from each other relative to the periphery and subdivide the sleeve wall into a plurality of legs. These recesses 227 extend, starting from the bottom circularly annular face side, in the axial direction over both grooves 235 and 233. These recesses 227 make it possible to elastically expand and constrict the sleeve wall in the radial direction R. The use of three recesses 227 in the sleeve 220 is mentioned only as an example. It is just as possible to provide, for example, four or five such recesses 227. Each leg has a spacer 226 on the face side. FIG. 2 is an enlarged view of the same sleeve 220 in a different perspective view.

In order to fix a first motor vehicle component to a second motor vehicle component, the first step is to align the first motor vehicle component, which is to be fixed, with respect to the second motor vehicle component. Then, the first fixing element 200 is placed on the second fixing element 300 in the axial direction, a procedure that can be performed by hand or by machine. As a result, the ball pin 310 of the second fixing element 300 is received in a positive locking manner in the opening 225 of the sleeve 220, which belongs to the first fixing element (first step).

Then, the cap 240 of the first fixing element 200 is moved by hand or by machine into a defined second position by moving the cap in the axial direction from the defined first position, in which the bottom bead ring segments 254 of the cap 240 engage with the upper groove 233 of the sleeve 220. In the defined second position, the bottom bead ring segments 254 engage with the bottom groove 235; and the upper bead ring segments 252 engage with the upper groove 233. At the same time it is necessary to overcome a resistance to motion induced by the engagement of the groove and bead elements. This engagement or, more specifically, this snap locking action of the groove and bead elements is audibly perceptible (for example, a clicking noise), when the cap 240 reaches the defined second position. In general, the angle of rotation position of the cap 240 relative to the sleeve 220 does not matter.

When the cap 240 is in the defined second position, it has the effect of elastically constricting the sleeve wall of the sleeve 220 in the radial direction and, in so doing, of pushing the legs of the sleeve wall in the radial direction against the ball pin 310 of the second fixing element 300, so that the result is a three-dimensional locking or, more specifically, securing (fixing) of the fixing elements 200 and 300 to each other (second step). A reliable securing of the sleeve 220 on the ball pin 310 is achieved in that all of the groove and bead elements engage with each other in the defined second position of the cap 240.

When the cap 240 is in the defined second position, the first motor vehicle component, which is to be fixed, is fitted into a fixing section, provided for the first motor vehicle component, under the rim 260 of the cap 240 and is then pushed against the second motor vehicle component, as a result of which the fixing is produced. Since all of the groove and bead elements engage with each other in the defined second position of the cap 240, a state that can also be referred to as the double engagement because of the two grooves 233 and 235 that are axially spaced apart, the cap 240 is held in its defined second position in an especially secure and reliable way. Optionally, it is also possible to adhesively cement the motor vehicle components and/or the components of the fixing arrangement.

Figure 4:
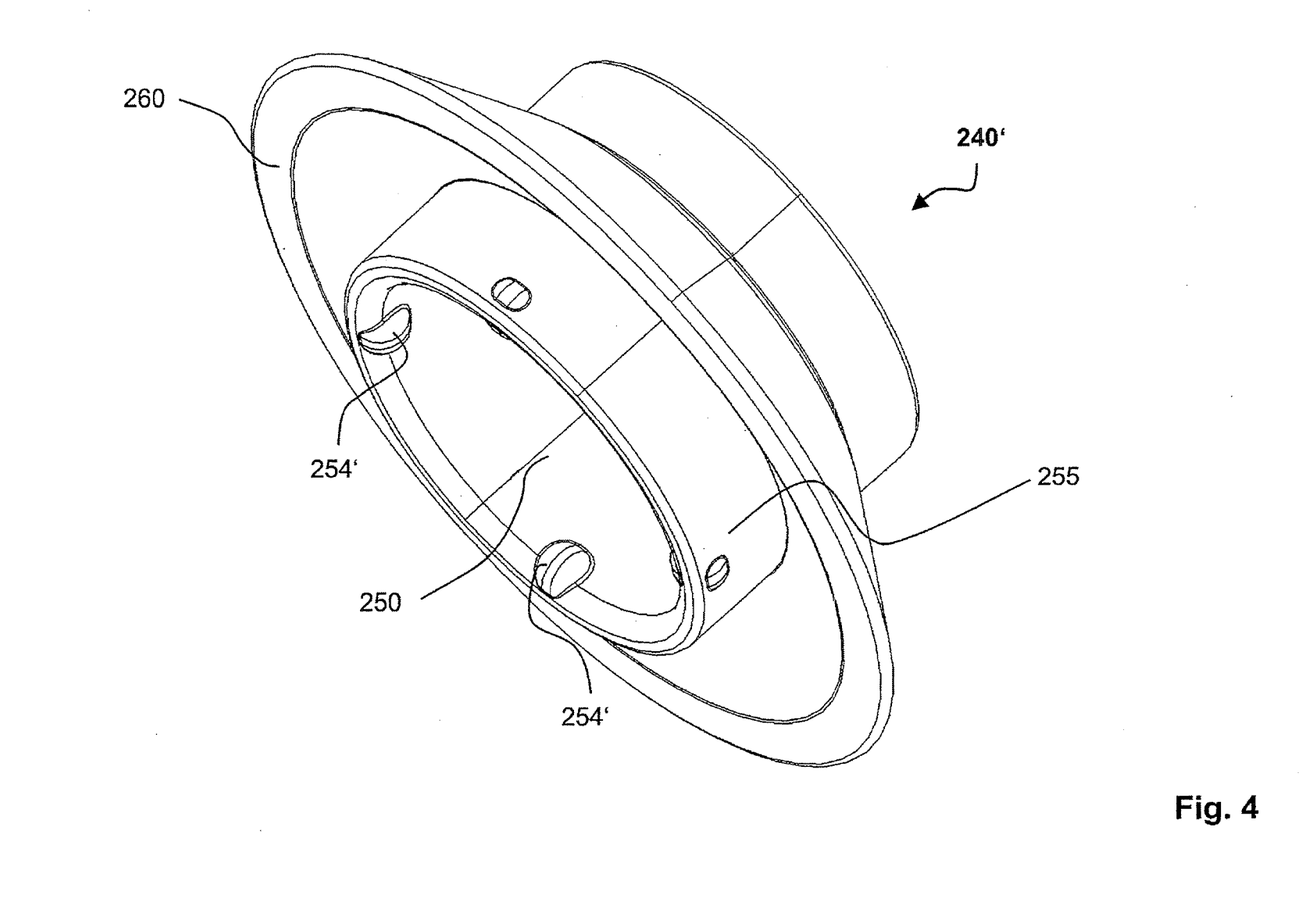
FIG. 4 shows an alternative exemplary embodiment of a cap in a perspective view.

Instead of the two grooves 233 and 235, it is also possible to provide three or more grooves on the sleeve 220 as well as to provide mutually corresponding bead rings or bead ring segments on the cap 240. Then it would also be possible to provide, for example, more than just two defined positions for the cap 240 on the sleeve 220. Furthermore, the bead ring segments 254 can also be configured as nubs 254', as shown in FIG. 4. Furthermore, the grooves and the bead rings (for example, the bead ring segments) can also be arranged in such a way that they are reversed.

Figure 5:
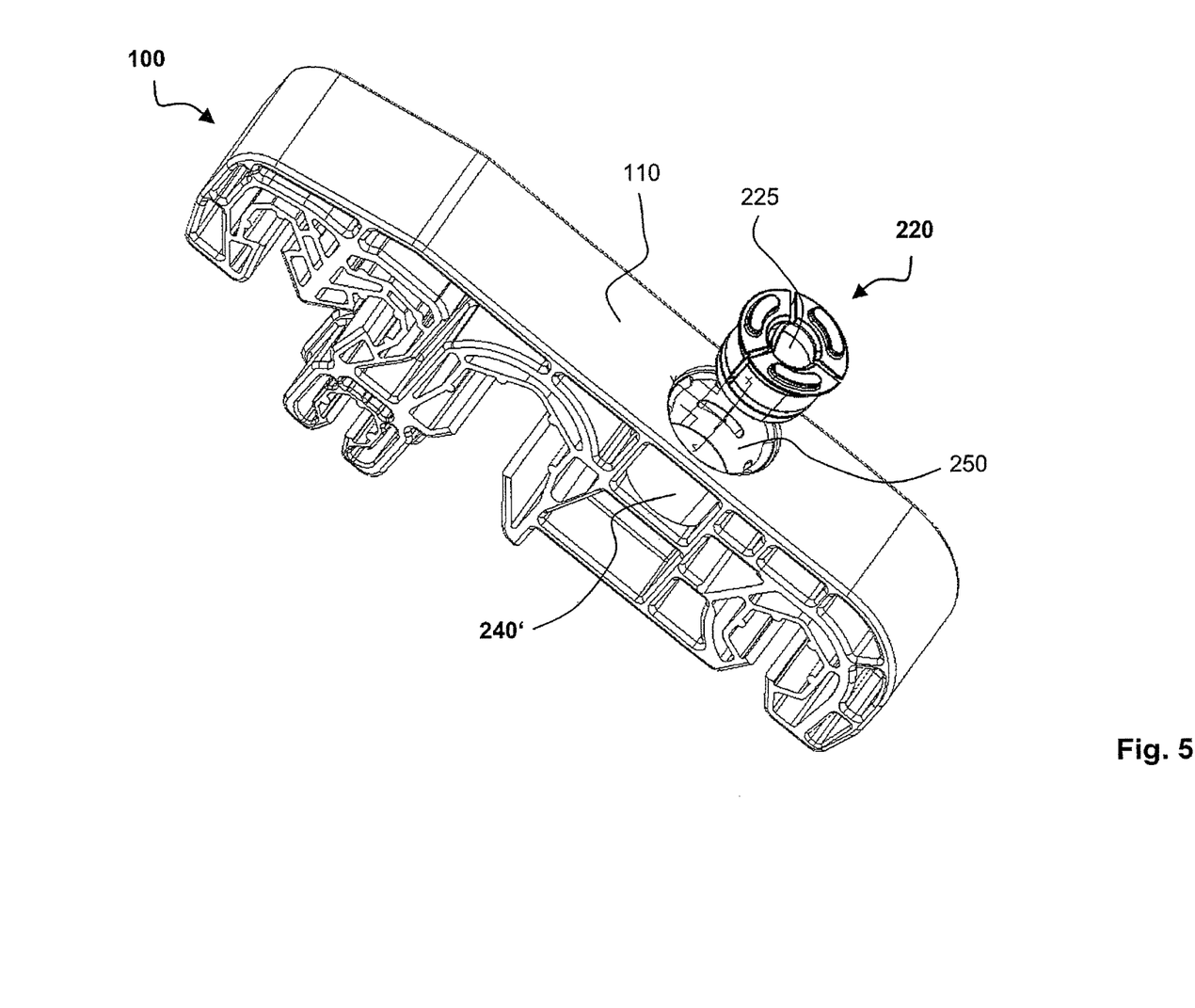
FIG. 5 shows a second exemplary embodiment of a fixing element, which is integrated into the motor vehicle component that is to be fixed, in a perspective exploded view.

FIG. 5 shows an exemplary embodiment, in which the first fixing element is integrated into the first motor vehicle component 100, which is to be fixed. The first motor vehicle component 100, which is to be fixed, is, for example, a cable conduit. The cap 240, which is explained in conjunction with the preceding figures, is designed in this case as a coupling 240' and is integrated into the motor vehicle component 100, which is to be fixed. For the sake of a better overview the sleeve 220 is shown separately. The cap or, more specifically, the coupling 240' can be constructed as one piece with the motor vehicle component 100. As an alternative, it is possible to manufacture the cap or, more specifically, the coupling 240' separately and to install the cap or coupling into the motor vehicle component 100 or to encapsulate the motor vehicle component in a suitable way during the manufacturing process. The motor vehicle component 100 is constructed, in particular, as a plastic injection molded article.

One advantage of this exemplary embodiment is that it simplifies the alignment of the motor vehicle component 100, which is to be fixed, and, in so doing, facilitates the fixing process of the motor vehicle component. The motor vehicle component 100 has only to be placed, together with the sleeve 220, on the ball pin 310 of the second fixing element 300 and then firmly pushed in the axial direction, until the flat section 110 of the motor vehicle component 100 impinges on the second motor vehicle component. At the same time, the sleeve 220 moves, starting from a defined first position up to a defined second position, into the central hole 250 of the coupling 240'.

It is also possible to provide a plurality of fixing arrangements according to the invention, in order to fix the motor vehicle component 100. In this case it is especially advantageous if the opening 225 is designed as an oblong hole in at least one of the sleeves or, more specifically, one of the couplings 240', in order to make it possible to compensate for mounting tolerances.

Figure 6:
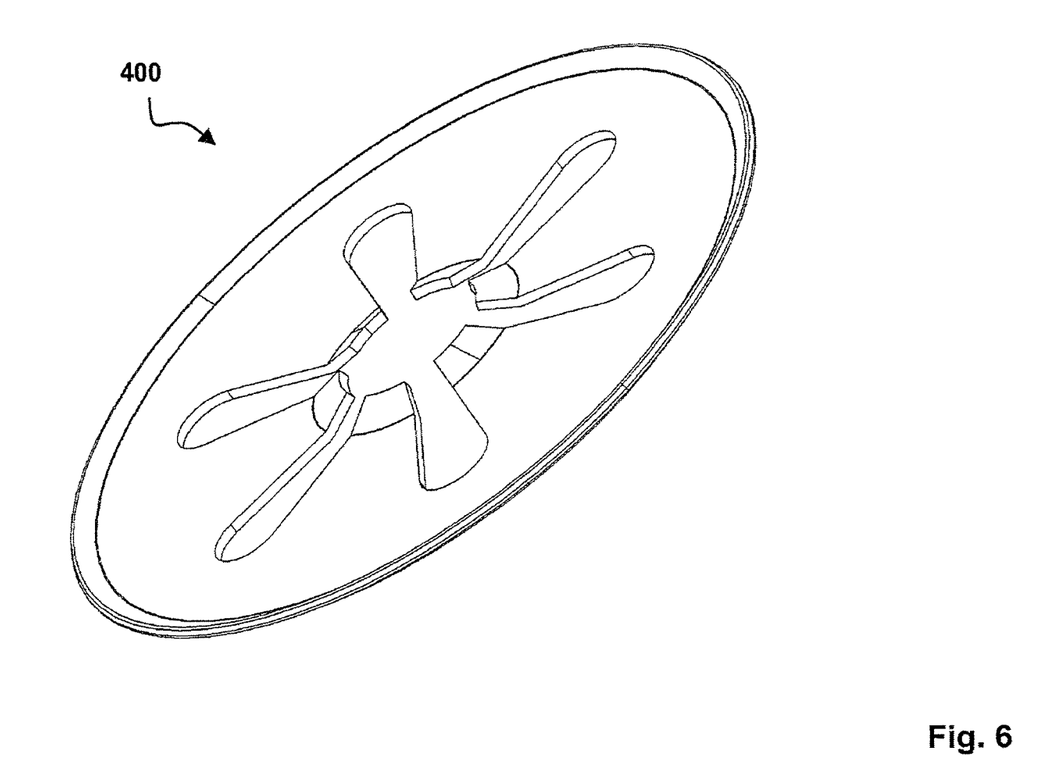
FIG. 6 shows a star washer for use in an inventive fixing arrangement in a perspective view.

FIG. 6 shows a star washer 400 for use in a fixing arrangement according to the invention. It is provided that the central star-shaped punched hole of the star washer 400 can engage with the ball pin 310 of the second fixing element 300. The star washer 400 is made preferably of a metal material and, in particular, a stainless steel material or a spring steel material and can be integrated, for example, into a sleeve 220 as the reinforcement and/or the sheathing, in order to increase, for example, the fixing forces. Such an additional measure makes sense, for example, in areas subject to thermal stress, such as in the case of fixing an exhaust pipe heat shield or a thermally conductive plate.

LIST OF REFERENCE NUMERALS 100 first motor vehicle component to be fixed
200 first fixing element
220 sleeve
225 opening
226 spacer
227 recess, slotted hole
233 groove
235 groove
240 cap (coupling)
250 central opening/central drill hole
252 bead (nubs)
254 bead (nubs)
255 cylindrical central piece
260 rim
300 second fixing element
310 ball pin
400 star washer The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fixing arrangement for fixing a first motor vehicle component to a second motor vehicle component, the fixing arrangement comprising:
   first and second fixing elements connectable to one another in a positive locking manner, wherein
   the second fixing element has a spherically configured pin in a manner of a ball,
   the first fixing element has a sleeve configured to fit over the spherically configured pin in order to produce a positive locking engagement,
   the first fixing element has a cap mounted on an outer shell surface of the sleeve so as to be movable in an axial direction to secure the fixing elements connected to one another in the positive locking manner, and
   the sleeve is secured on the spherically configured pin via an axial relative movement of the cap from a defined first position away from the spherically configured pin into a defined second position nearer the spherically configured pin,
   first and second mating groove and bead elements operatively arranged on the outer shell surface of the sleeve and on a corresponding inner shell surface of the cap, respectively,
   wherein the first and second mating groove and bead elements are axially spaced apart from one another to define the defined first position and the defined second position of the cap relative to the sleeve, and wherein both the first and second mating groove and bead elements are engaged with one another in the defined second position in order to secure the sleeve on the spherically configured pin.

2. The fixing arrangement according to claim 1, wherein the sleeve comprises a fixing section in an axial end area, the fixing section fitting at least in sections over the spherically configured pin in a fixed state; and wherein a wall of the sleeve has a plurality of recesses extending longitudinally in an axial direction in the axial end area.

3. The fixing arrangement according to claim 1, wherein only some of the first mating groove and bead elements engage one another in the defined first position in order to mount the cap on the sleeve secure from loss.

4. The fixing arrangement according to claim 2, further comprising:

a plurality of spacers arranged on a face side of the fixing section of the sleeve.

5. The fixing arrangement according to claim 3, further comprising:

a plurality of spacers arranged on a face side of the fixing section of the sleeve.

6. The fixing arrangement according to claim 1, wherein the second motor vehicle component is a body component integrated into a body of a motor vehicle, and the first motor vehicle component to be fixed is one of an add-on part and an installation part.

7. The fixing arrangement according to claim 1, wherein the first fixing element is integrated into the first motor vehicle component to be fixed.

8. The fixing arrangement according to claim 7, wherein the first fixing element comprises one of a synthetic plastic material and a composite material.

9. The fixing arrangement according to claim 1, wherein the first fixing element comprises one of a synthetic plastic material and a composite material.

\* \* \* \* \*